(12) United States Patent
Hensler et al.

(10) Patent No.: US 10,821,906 B2
(45) Date of Patent: Nov. 3, 2020

(54) VEHICULAR SUPPORT FOR SURFBOARD

(71) Applicant: Hensler Imagineering, LLC, Wilmington, NC (US)

(72) Inventors: Morgan Layne Hensler, Wilmington, NC (US); Robert Sean Hensler, Wilmington, NC (US); Raeshon Lamont McNeil, Charlotte, NC (US)

(73) Assignee: Hensler Imagineering, LLC, Wilmington, NC (US)

( * ) Notice: Subject to any disclaimer, the term of this patent is extended or adjusted under 35 U.S.C. 154(b) by 0 days.

(21) Appl. No.: 16/504,154

(22) Filed: Jul. 5, 2019

(65) Prior Publication Data

US 2020/0010020 A1    Jan. 9, 2020

Related U.S. Application Data

(60) Provisional application No. 62/694,209, filed on Jul. 5, 2018.

(51) Int. Cl.
*B60R 9/08*    (2006.01)
*B60R 9/045*    (2006.01)

(52) U.S. Cl.
CPC .............. *B60R 9/08* (2013.01); *B60R 9/045* (2013.01)

(58) Field of Classification Search
CPC ... B60R 9/08; B60N 2002/905; A47F 7/0035; A47F 5/2013; A47B 47/005; A47B 47/0058
USPC ......... 224/275, 402, 519–521, 497; 248/161, 248/166, 407, 157, 423, 432; 211/70.5, 211/85.7, 204, 206, 182
See application file for complete search history.

(56) References Cited

U.S. PATENT DOCUMENTS

| | | | | |
|---|---|---|---|---|
| 3,338,484 A | * | 8/1967 | Hall, Sr. | B62J 11/00 224/442 |
| 3,477,586 A | * | 11/1969 | Haluska | A47B 81/005 211/64 |
| 4,627,544 A | * | 12/1986 | Scarpa | A47F 5/14 211/189 |
| 5,215,234 A | * | 6/1993 | Pasley | B60R 9/06 224/508 |
| 5,292,045 A | * | 3/1994 | Mandel | B60R 9/00 224/309 |
| 5,377,849 A | * | 1/1995 | Martin | A47F 8/02 211/85.7 |
| 5,592,750 A | * | 1/1997 | Eichten | D06F 59/02 223/70 |

(Continued)

*Primary Examiner* — Adam J Waggenspack
(74) *Attorney, Agent, or Firm* — Chad D. Tillman; Tillman Wright, PLLC

(57) ABSTRACT

A method for supporting a surfboard during vehicular transport includes positioning an apparatus in a backseat of a convertible such that the apparatus stands on each of two seats of the backset; using seatbelts in the backset of the convertible, securing the apparatus against backs of the seats; with the top of the convertible down, positioning the surfboard onto a top of a frame of a windshield of the convertible while positioning the surfboard onto a platform of the apparatus; and securing the surfboard to the platform using one or more straps. The surfboard is supported on the convertible by the windshield frame and by the platform of the apparatus that has been stood up in the backseat of the convertible.

20 Claims, 16 Drawing Sheets

(56) References Cited

U.S. PATENT DOCUMENTS

2004/0031832 A1* 2/2004 Crook .................. B60P 3/34
224/405
2010/0193555 A1* 8/2010 Gift .................... B60R 9/08
224/321

* cited by examiner

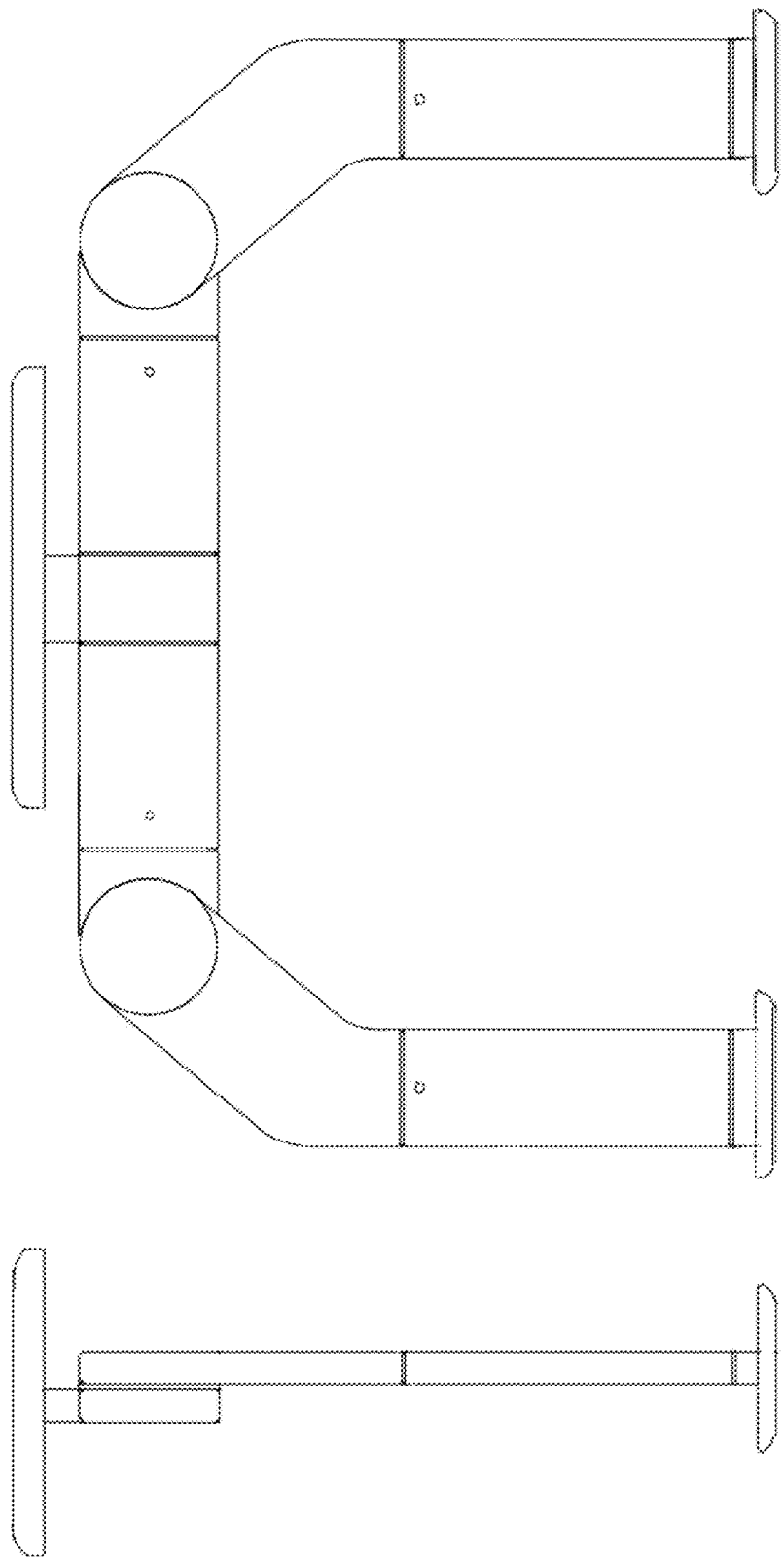

VEHICULAR SUPPORT FOR SURFBOARD

CROSS-REFERENCE TO RELATED APPLICATION

The present application is a nonprovisional U.S. patent application of, and claims priority under 35 U.S.C. § 119(e) to, provisional U.S. patent application Ser. No. 62/694,209, filed Jul. 5, 2018.

COPYRIGHT STATEMENT

Any new and original work of authorship in this document—including any source code—is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The present invention generally relates to apparatus and methods for transporting a board using a vehicle, and preferably for transporting a surfboard using a convertible. As used herein, "board" means any of a surfboard, a windsurfing board, a paddleboard, or other similarly shaped board. An "elongate object" means a board, a kayak, a canoe, or other elongate object that may be accommodated by an apparatus of the invention.

Apparatus and methods for transporting a board using a vehicle generally are known, as demonstrated by each of U.S. Pat. Nos. 8,496,146; 5,492,259; 5,381,939; 5,292,045; 4,538,752; German Patent No. DE3915359A1; German Patent No. DE3520132A1; and US Patent Appl. Publ. No. 2012/0193380.

While each of these references disclose apparatus and methods that are suitable for their intended purposes, it is believed that a need exists for a simpler solution that is consumer friendly to purchase and use without any structural modification or addition to a consumer's vehicle.

It also is believed that a need exists for apparatus and methods that enable the entirety of the apparatus to be safely locked within the vehicle during use of the board following transport to the location of use.

One or more such needs are believed to be addressed by apparatus and methods for supporting a board for vehicular transport in accordance with a preferred embodiment of one or more aspects and features of the invention.

SUMMARY OF THE INVENTION

The present invention includes many aspects and features. Moreover, while many aspects and features relate to, and are described in, the context of transporting an elongate object and especially a surfboard, the present invention is not limited to use only in such context, as will become apparent from the following summaries and detailed descriptions of aspects, features, and one or more embodiments of the present invention. Indeed, it is intended that the apparatus support any elongate object for vehicular transport.

Accordingly, in an aspect of the invention, an apparatus for supporting an elongate object for vehicular transport comprises: (a) a first leg adapted for placement on a seat of a backset of a convertible; (b) a second leg adapted for placement on another seat of the backset of the convertible; and (c) an upper support body supported by the first and second legs and comprising a platform for abutment and support thereon of the elongate object.

In a feature, the elongate object comprises a board. The board may a surfboard, a windsurfing board, a paddleboard, or other a similarly shaped board.

In a feature, the elongate object comprises a kayak, a canoe, or other elongate object having a similar hull.

In a feature, the legs are similar in structure and are interchangeable.

In a feature, the platform transitions between an elevation above headrests of the convertible and below headrests of the convertible. The platform preferably transitions by rotation.

In a feature, the platform comprises a material that cushions the elongate object during vehicular transport.

In a feature, the platform is formed from a resilient, rubber-like material.

In a feature, the platform is padded.

In a feature, the platform comprises loops located at opposite lateral sides thereof for receiving hooks, carabiners, or other connectors of a strapping system for securing the elongate object to the platform for vehicular transport.

In a feature, the legs are adjustable for changing the height of the upper body support.

In a feature, each leg comprises a seatbelt guide

In a feature, each leg comprises a pair of opposed seatbelt guides.

In a feature, each seatbelt guide comprises a hook or finger for grabbing a seatbelt.

In a feature, each seatbelt guide comprises a loop enclosing an opening dimensioned to receive the end of a seatbelt therethrough.

In a feature, the apparatus further comprises an additional platform for accommodating a second elongate object.

In a feature, the apparatus further comprises at least four axes of rotation.

In a feature, the apparatus further comprises six axes of rotation.

In additional features: the upper support body comprises a first elongate portion and a second elongate portion; the first elongate portion has a proximal, curved end in the form of an elbow and the second elongate portion has a proximal, curved end in the form of an elbow; a crossmember extends therebetween and is connected by a first coupling to the curved end of the first elongate portion and is connected by a second coupling to the curved end of the second elongate portion; a neck extends from the crossmember and is connected to an arm portion; the arm portion is connected to a platform by couplings; the platform comprises loops defining enclosed openings and located at opposite lateral sides thereof for receiving hooks, carabiners, or other connectors of a strapping system for securing an elongate object to the platform for vehicular transport; each leg comprises an elongate portion having a foot at a distal end thereof and an open end at a proximal end thereof; each foot is designed for placement on a seat of a vehicle and includes a backstop for positioning against a back of the seat of the vehicle; the elongate portion of each leg is adapted to receive one of the elongate portions of the upper body support through the open end and along an extent thereof from the open end, whereby the height of the upper body support relative to each foot is adjustable; each elongate portion of the upper body support comprises a sequence of openings, each of which opening is common in size with an opening in the elongate portion of the leg, all of said openings being adapted to receive therethrough a cotter pin; by aligning a selected one of the openings of the sequence of the elongate portions of the upper body support with the openings in the legs, the upper body support is secured in a fixed position relative to each foot of the legs, whereby the legs are thereby adjustable for adjusting the height of the upper support body relative to the feet; each of the legs comprises two seatbelt guides in the form of opposed hooks or fingers for grabbing a seatbelt; each lower guide of a leg is designed to restrain the leg from lifting upward when secured by a seatbelt; and each upper guide of a leg is designed to restrain the leg against the back of a seat of the vehicle.

In another aspect, a method for supporting an elongate object during vehicular transport comprises the steps of: (a) positioning an apparatus in a backseat of the convertible such that the apparatus stands on each of two seats of the backset; (b) using seatbelts in the backset of the convertible, securing the apparatus against backs of the seats; (c) with the top of the convertible down, positioning the elongate object onto a top of a frame of a windshield of the convertible while positioning the elongate object onto a platform of the apparatus; and (d) securing the elongate object to the platform of the apparatus using a strapping system. The elongate object is supported on the convertible by the windshield frame and by the platform of the apparatus that is stood up in the backseat of the convertible.

In a feature, the method further comprises the steps of removing the elongate object for use and securing the apparatus during use of the elongate object by repositioning the platform downwardly, enclosing the convertible including putting the top of the convertible up, and locking the convertible with the apparatus securely contained within the enclosed convertible.

In another aspect, a vehicle for supporting an elongate object for transport comprises: (a) an apparatus stood up in a backseat of the vehicle and having a platform positioned upwardly in engagement with an elongate object; (b) wherein the apparatus is secured to the vehicle only by one or more seatbelts of the vehicle.

In a feature, the elongate object further is supported by a frame of the windshield of the vehicle.

In a feature, the vehicle further comprises a platform attached to the frame of the windshield on which platform the elongate object is further supported.

In a feature, the vehicle further comprises one or more straps secured to the apparatus and extending around the elongate object.

In a feature, the vehicle further comprises one or more straps secured to the apparatus and to the elongate object.

In a feature, the vehicle further comprises loops defining enclosed openings for receiving straps.

In a feature, the vehicle is a convertible.

In a feature, the vehicle is a two-door convertible.

In a feature, the vehicle is a four-door convertible.

In another aspect, a vehicle for supporting an elongate object for transport comprises: a convertible; and means for supporting the elongate object for vehicular transport using the convertible.

Still further aspects and features of the invention are disclosed in the Appendix to the specification, which Appendix is incorporated herein by reference.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals.

FIGS. 7-15 are schematic illustrations of another vehicular transport for a board in accordance with a preferred embodiment of one or more aspects and features of the invention.

DETAILED DESCRIPTION

Figure 1:
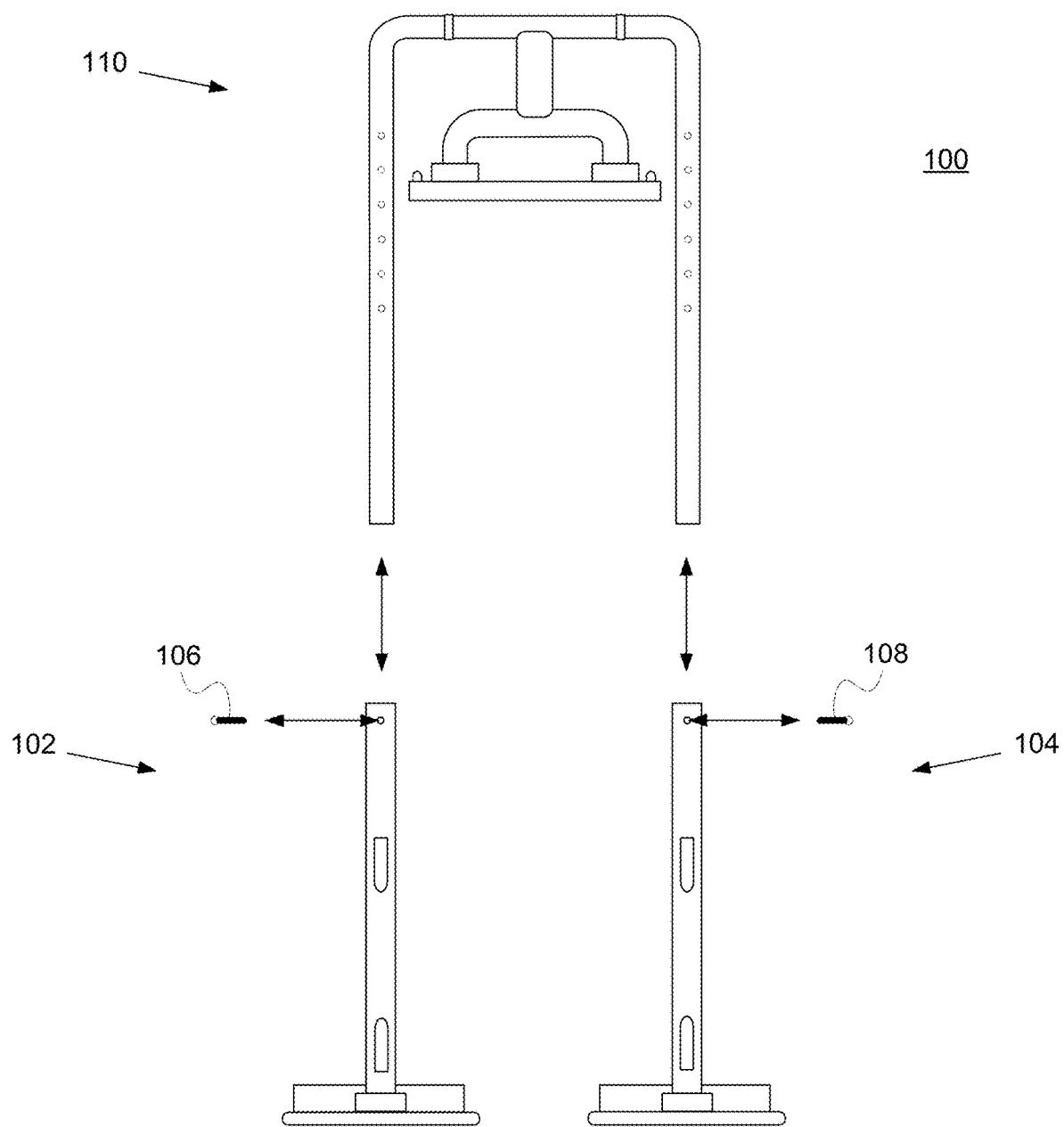
FIG. 1 comprises an exploded, front plan view of an apparatus 100 for supporting a board for vehicular transport in accordance with a preferred embodiment of one or more aspects and features of the invention.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

Referring now to the drawings, one or more preferred embodiments of the invention are next described. The following description of one or more preferred embodiments is merely exemplary in nature and is in no way intended to limit the invention, its implementations, or uses.

FIG. 1 is an exploded, front plan view of an apparatus 100 for supporting a board for vehicular transport in accordance with a preferred embodiment of one or more aspects and features of the invention. The apparatus 100 comprises a first leg 102; a second leg 104; a first cotter pin 106; a second cotter pin 108; and an upper support body 110.

Figure 2:
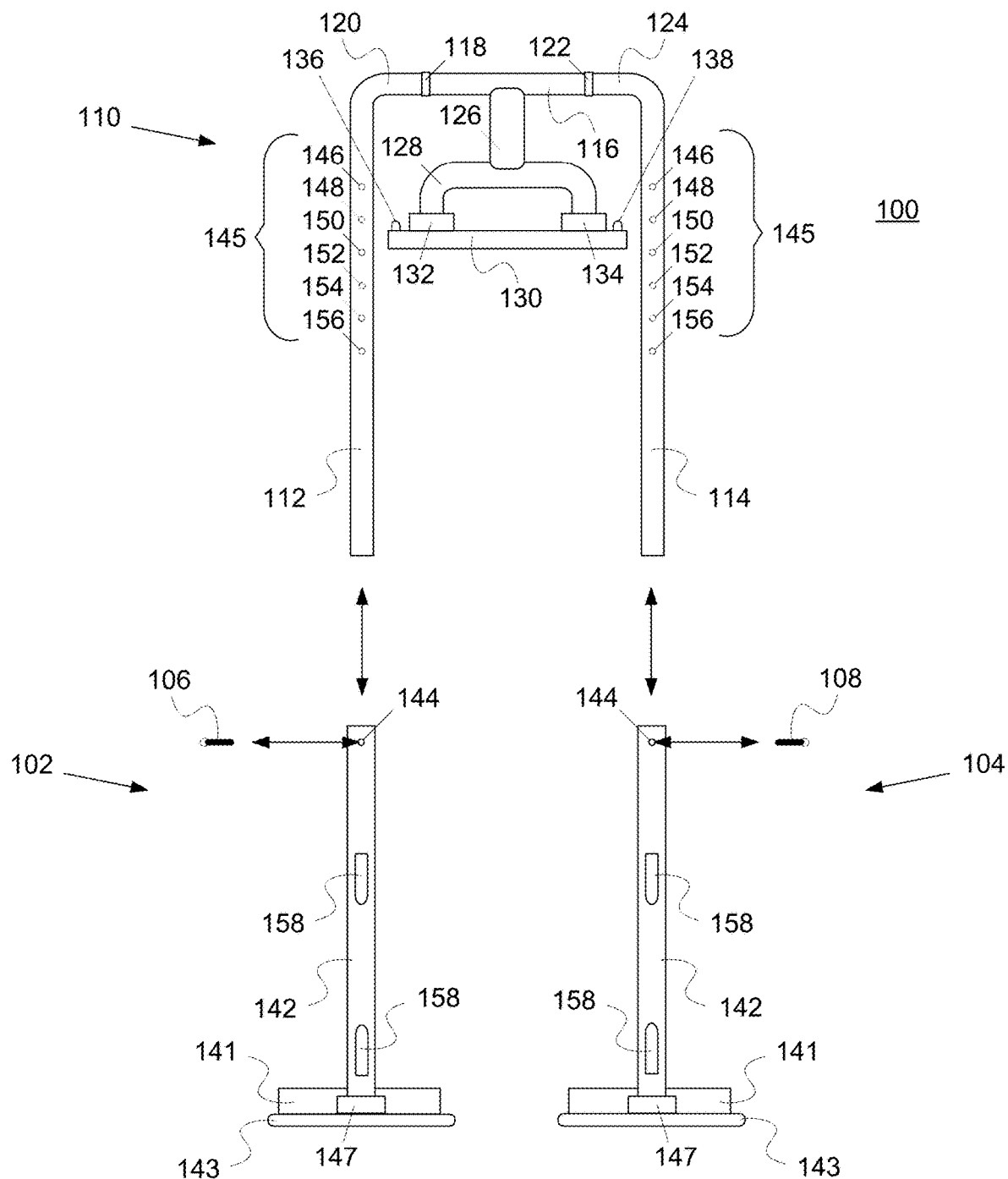
FIG. 2 comprises another view of FIG. 1 illustrating numerous additional callouts.

With reference to FIG. 2—which is the view of FIG. 1 but further illustrates numerous additional callouts—the upper support body 110 comprise a first elongate portion 112 and a second elongate portion 114. The first elongate portion 112 has a proximal, curved end 120 in the form of an elbow and the second elongate portion 114 has a proximal, curved end 124 in the form of an elbow. A crossmember 116 extends therebetween and is connected by a first coupling 118 to the end 120 and is connected by a second coupling 122 to the curved end 124.

A neck 126 extends from the crossmember 116 and is connected to an arm portion 128 of the upper body support 110. The arm portion 128 is connected to a platform 130 by couplings 132,134. The arm portion 128 preferably is generally U-shaped, but may have alternative shapes. The platform 130—which is intended to abut a board during vehicular transport—preferably comprises a material that cushions such board during vehicular transport. The platform 130 may, for example, be formed from a resilient, rubber-like material or padded. The platform 130 also comprises loops 136,138 defining enclosed openings and located at opposite lateral sides thereof for receiving hooks, carabiners, or other connectors of a strapping system for securing a board to the platform 130 for vehicular transport.

The legs 102,104 are similar in structure and preferably interchangeable. Each leg comprises an elongate portion 142 having a foot 143 at a distal end thereof and an open end at a proximal end thereof. Each foot 143 is designed for placement on a seat of a vehicle and includes a backstop 141 for positioning against a back of the seat of the vehicle.

The elongate portion 142 of each leg 102,104 is adapted to receive one of the elongate portions of the upper body support 110 through the open end and along an extent thereof from the open end. The elongate portion 142 defines an opening 144 through which one of the pins 106,108 is received. Each elongate portion of the upper body support 110 comprises a sequence 145 of openings 146,148,150, 152,154,156 each of which opening is common in size with opening 144 and also is adapted to receive therethrough one of the pins 106,108. By aligning a selected one of the openings of the sequence 145 of the elongate portions of the upper body support 110 with the openings 144 in the legs 102,104, the upper body support 110 can be secured in a fixed position relative to each foot 143 of the legs 102,104. The legs 102,104 are thereby adjustable for adjusting the height of the upper support body 110 relative to the feet.

Each of the legs 102,104 further comprises two seatbelt guides 158 in the form of opposed hooks or fingers for grabbing a seatbelt. Each lower guide 158 of a leg is designed to restrain the leg from lifting upward when secured by a seatbelt, and each upper guide 158 of a leg is designed to restrain the leg against the back of a seat of the vehicle. In alternative embodiments, the guides comprise loops each enclosing an opening dimensioned to receive the end of a seatbelt therethrough.

Figure 3:
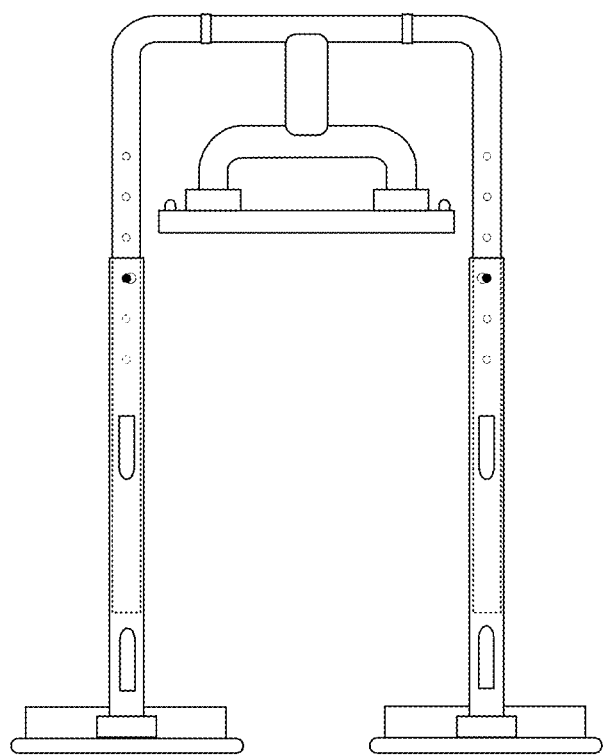
FIG. 3 comprises a front plan view of the apparatus 100 of FIG. 1 in a first orientation.

To assemble the apparatus 100, one of the legs 102,104 is attached onto the upper support body 110 and secured thereto with one of the pins 106,108, and the other leg is attached onto the upper support body and secured thereto with the other pin. The assembled apparatus 100 is illustrated in FIG. 3. The pins 106,108 have been inserted through openings 144 in the legs and openings 152 in the upper body support 110 for securing the apparatus 100 together at a desired height of the upper body support relative to the feet.

Figure 4:
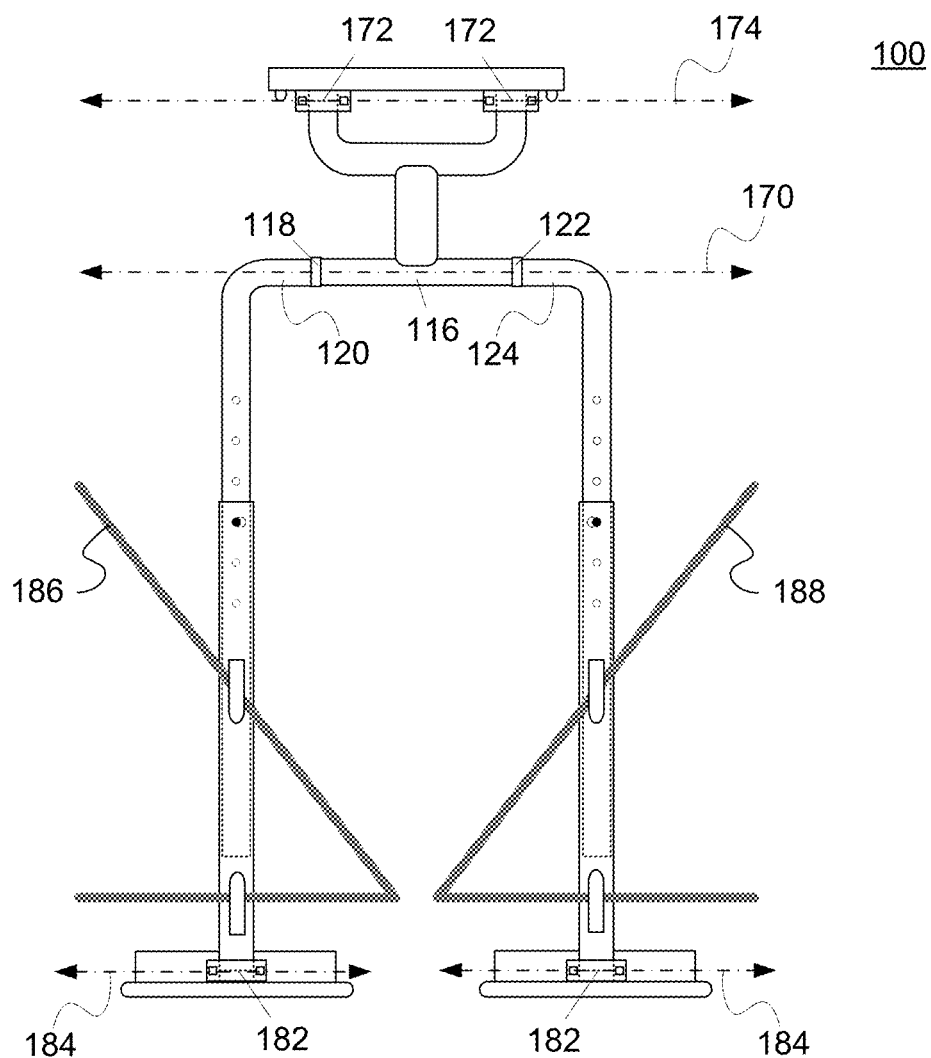
FIG. 4 comprises a front plan view of the apparatus 100 of FIG. 1 in a second orientation, in which axes of rotation are illustrated.

FIG. 4 illustrates that the crossmember 116 is connected by the couplings 118,122 to the proximal ends of the elongate members of the upper support body such that the crossmember 116 rotates about axis 170 relative to the elongate members. It will be appreciated that FIG. 4 illustrates the apparatus in a "use" orientation, with the platform 130 is rotated upwardly and is ready to abut and support there against a board. In contrast, the apparatus is seen in a "nonuse" orientation in FIG. 3, wherein the platform 130 is positioned downwardly, is located in-between the legs, and in such position is incapable of abutting and supporting a board.

FIG. 4 also illustrates in further detail couplings 132,134 and couplings 147. Each coupling comprises a pivot pin connector enabling the connected members to pivot relative to each other along an axis of the pivot pin.

In particular, each of couplings 132,134 comprises a pivot pin 172 in the form of a bolt, with the pivot pins aligned along a common pivot axis 174. The couplings 132,134 thereby collectively enable the platform 130 to pivot relative to the arm portion 128 about the common pivot axis 174.

Similarly, each coupling 147 comprises a pivot pin 182 in the form of a bolt, with the pivot pins aligned along a common pivot axis 184 when the legs are secured in like manner to the upper body support 110. The couplings 82 thereby collectively enable each foot 143 to pivot relative to the elongate portion 142 about the common pivot axis 184.

When the apparatus 100 is positioned in a backseat of a vehicle such as a bucket seat and, especially, a back seat of a convertible, the feet are placed on the seats with the backstops positioned against the seat backs. The legs are pivoted relative to the feet so as to abut and rest against the backs of the seats. The upper body support supports a board in conjunction with the support of the board by a frame of a windshield of the vehicle and, in particular, the height of the upper body support is set at an elevation such that the platform abuts and supports the board in a generally level position without any significant incline of the board relative to the horizontal. The platform also is rotated for positioning at a better angle for abutting and supporting the board. The backset passenger seatbelts are used to anchor the apparatus via the seatbelt guides, as schematically represented by seatbelts 186,188 in FIG. 4.

Figure 5:
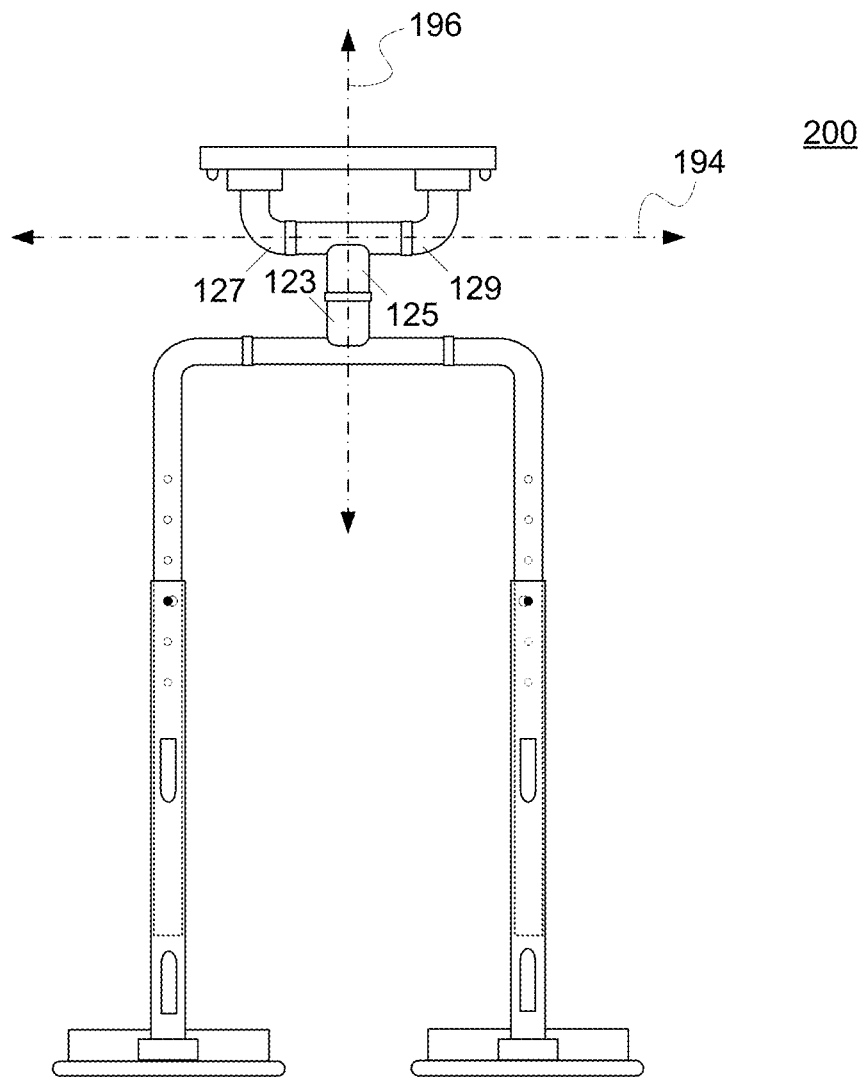
FIG. 5 comprises a front plan view of another apparatus 200 for supporting a board for vehicular transport in accordance with a preferred embodiment of one or more aspects and features of the invention.

In alternatives to apparatus 100, and with reference to apparatus 200 of FIG. 5, the arm portion may be replaced with two separate arm portions 127,129 coupled to a neck for rotation relative thereto about an axis 194, with each arm portion being coupled to and supporting the platform. The neck alternatively or additionally may be replaced with two separate neck portions 123,125 coupled together for rotation relative therebetween about an axis 196, whereby the platform may be swiveled relative to the legs. Such additional adjustability is believed to better enable the apparatus 200 to support a board.

While not shown it further is contemplated that rotation and swiveling may be locked or otherwise fixed once desirable orientation are achieved. Such locking may be accomplished, for example, using cotter pins as previously illustrated, or by other means including latches, fasteners, tensioned binding, or other conventional mechanisms. Alternatively, the couplings may be sufficiently tight to enable only forced manual positioning such that, without application of significant manual force, no rotation or swiveling movement naturally occurs during normal use of the apparatus. Such tight connections may be achieved with close frictional fits between components.

Figure 6:
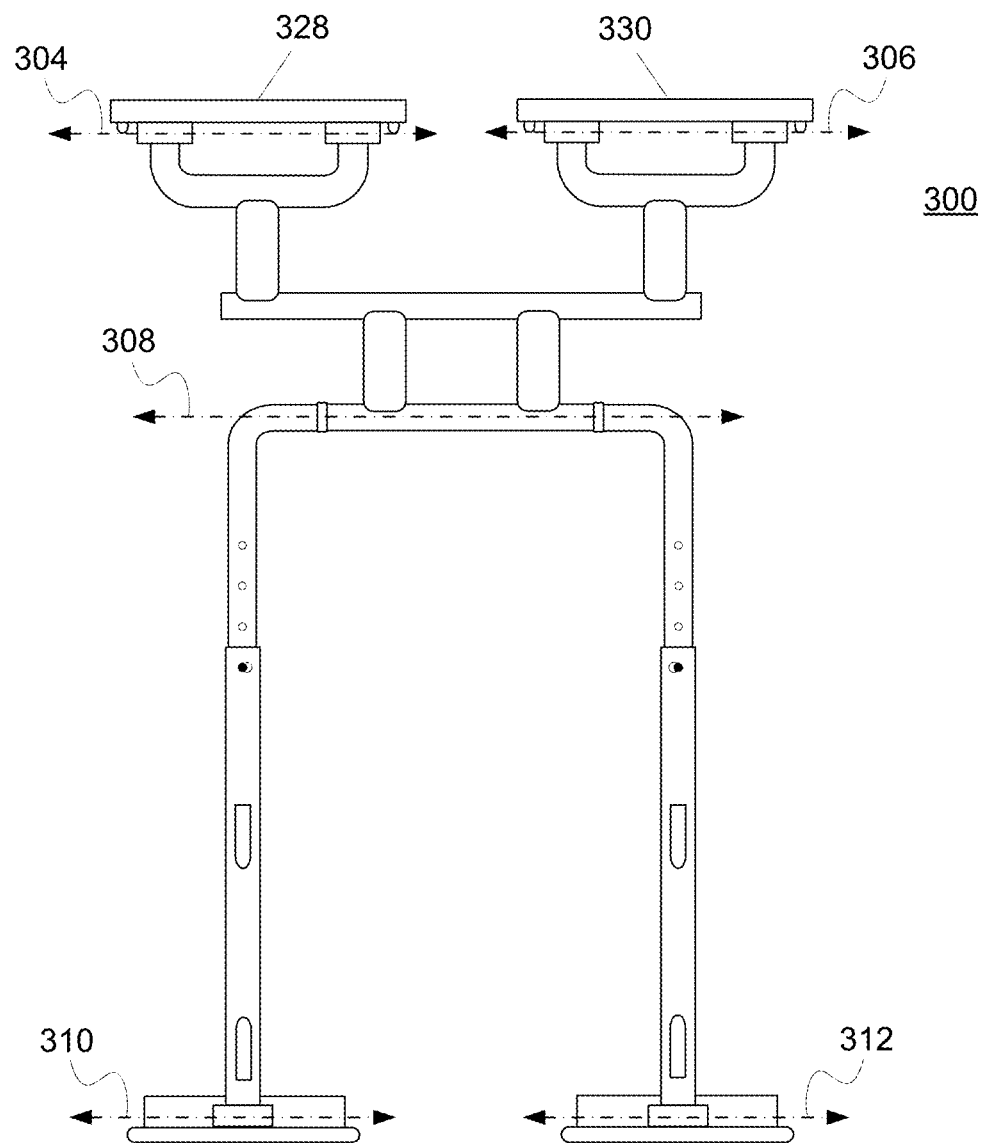
FIG. 6 comprises a front plan view of another apparatus 300 in a use orientation for supporting a board for vehicular transport in accordance with a preferred embodiment of one or more aspects and features of the invention.

Another alternative is illustrated in FIG. 6, wherein the illustrated apparatus 300 comprises two platforms 328,330 for accommodating two boards. The preferred, different axes of rotation 304,306,308,310,312 of the apparatus 300 also are illustrated.

The apparatus 100,200,300 preferably are constructed using components made from steel, aluminum, and titanium, including alloys thereof. Alternatively, the components may be made from fiberglass, and carbon fibers. PVC piping including couplings and elbows also may be used.

FIG. 5 is a front plan view of another embodiment 200 of an apparatus for supporting a board for vehicular transport in accordance with one or more aspects and features of the invention.

FIG. 6 is a front plan view of another embodiment 300 of an apparatus in a use orientation for supporting a board for vehicular transport in accordance with one or more aspects and features of the invention.

It further is contemplated that a front support with platform may be used, upon which also board rests rather than simply resting of the board on the frame of the windshield. Such front support preferably latches onto the windshield frame similar to the conventional latching of the roof of the vehicle. The front support with the platform preferably latches to both sides of the frame and provides padded support to the board. An additional platform may be included when two boards are supported, such as when apparatus 300 is used.

Prototypes

Prototypes supporting a surfboard for vehicular transport in accordance with one or more aspects and features of the invention have actually been reduced to practice and used. The remaining drawings pertain to such prototypes.

Figure 7:
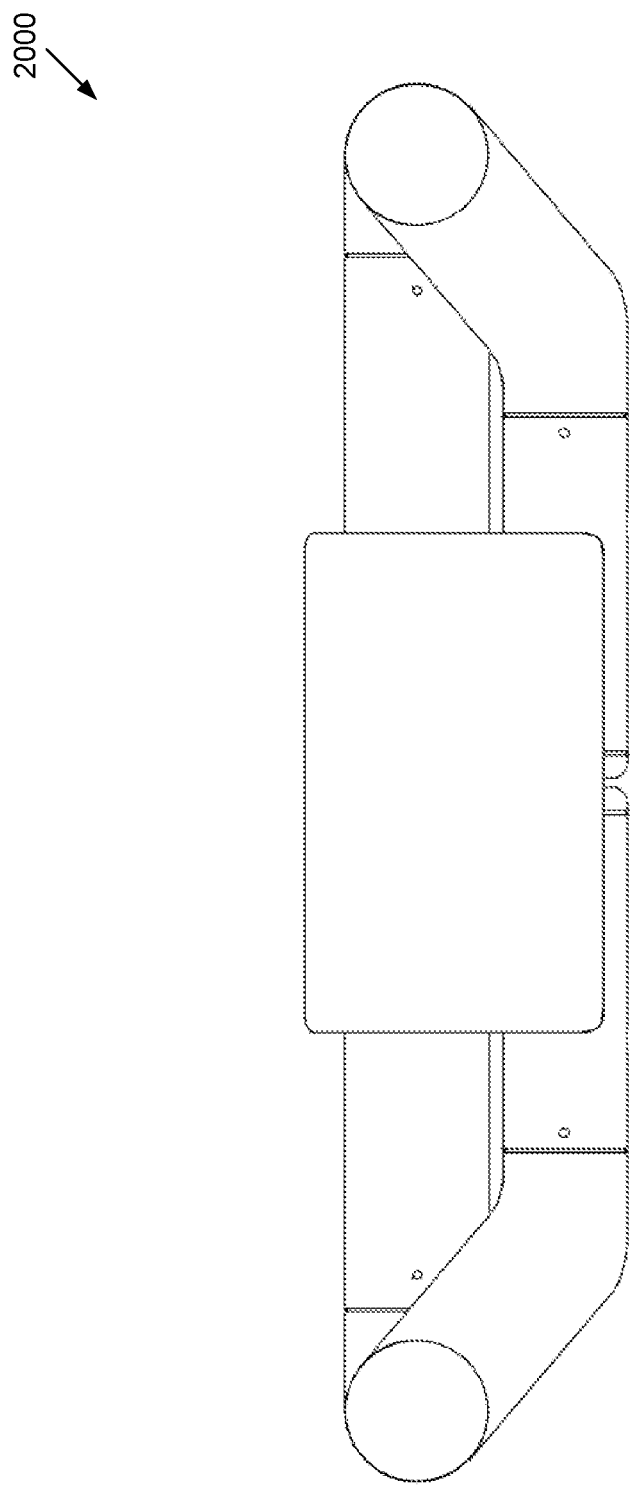
FIG. 7 comprises a view of a prototype 1000 supporting a surfboard for vehicular transport in accordance with a preferred embodiment of one or more aspects and features of the invention.
Figure 8:
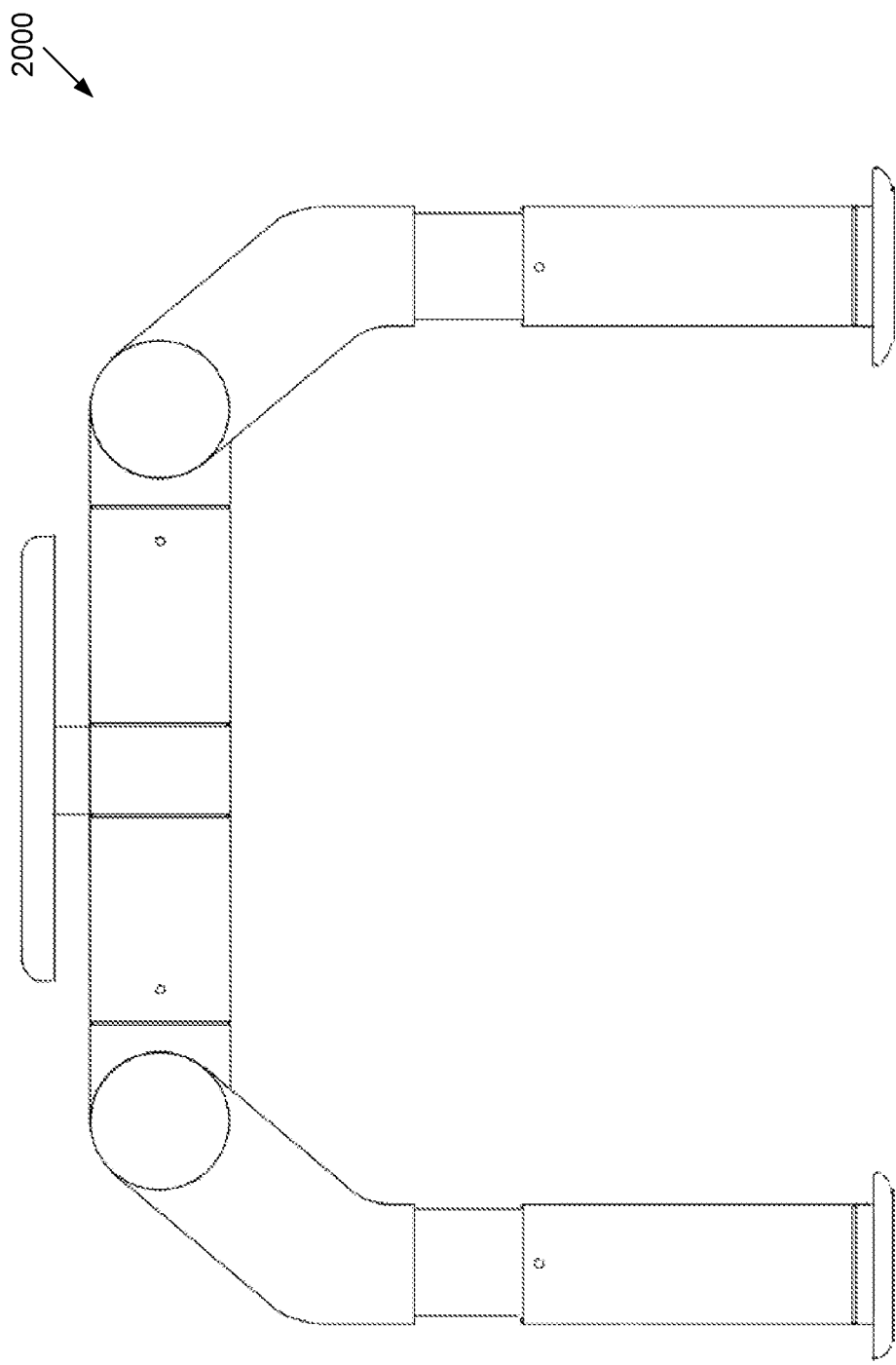
FIGS. 8-11 each comprises another view of the prototype 1000 of FIG. 7 supporting another surfboard for vehicular transport in accordance with a preferred embodiment of one or more aspects and features of the invention.
Figure 9:
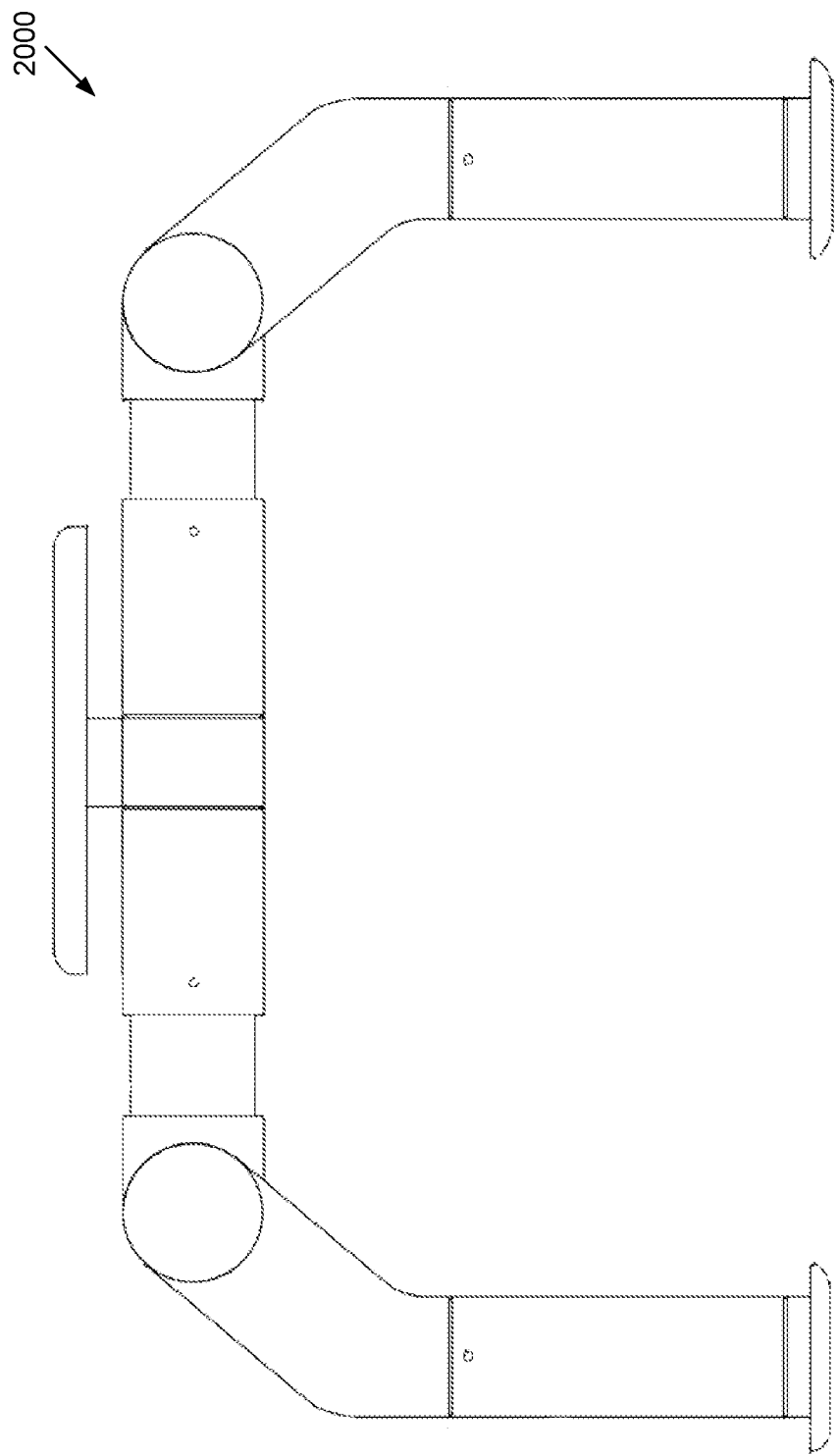

In this regard, FIG. 7 of U.S. patent application publication 2020/0010020 ("Published Application"), the disclosure of which is incorporated herein by reference, comprises a view of a prototype 1000 supporting a surfboard for vehicular transport in accordance with one or more aspects and features of the invention, and FIGS. 8-11 of the Published Application comprise additional views of the prototype 1000 supporting another surfboard for vehicular transport in accordance with one or more aspects and features of the invention.

Figure 13:
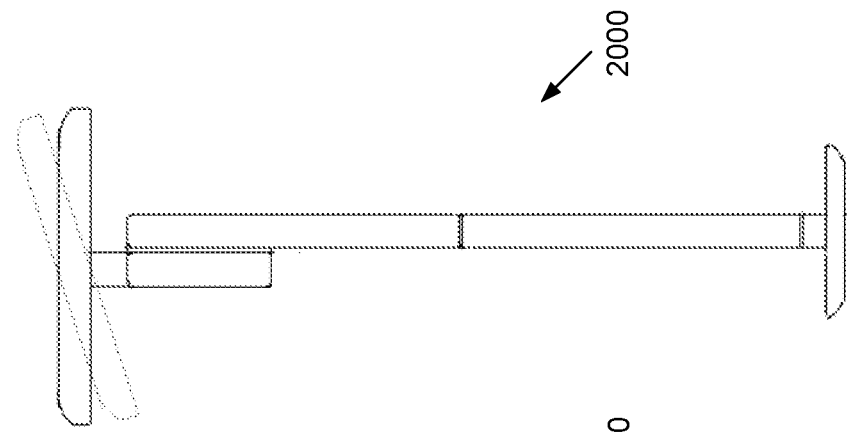
FIG. 13 comprises a closeup view of an adjustable leg of the prototype 1000 seen in FIG. 12.
Figure 12:
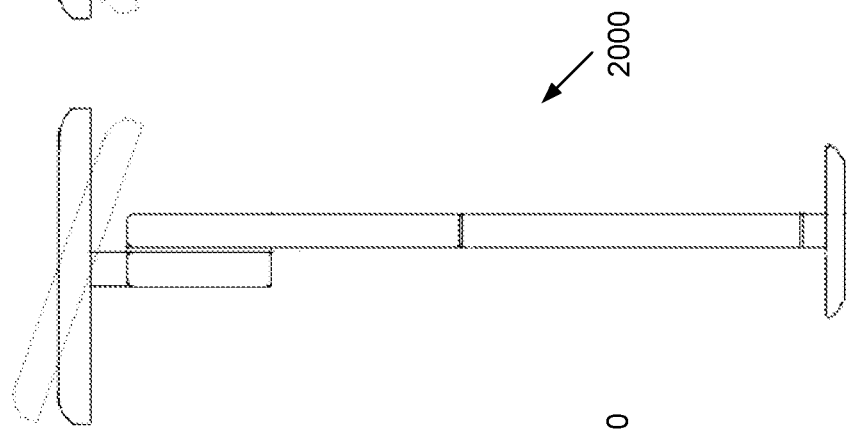
FIG. 12 comprises another view of the prototype 1000 of FIGS. 8-11 in a use orientation but without a surfboard supported thereon.
Figure 11:
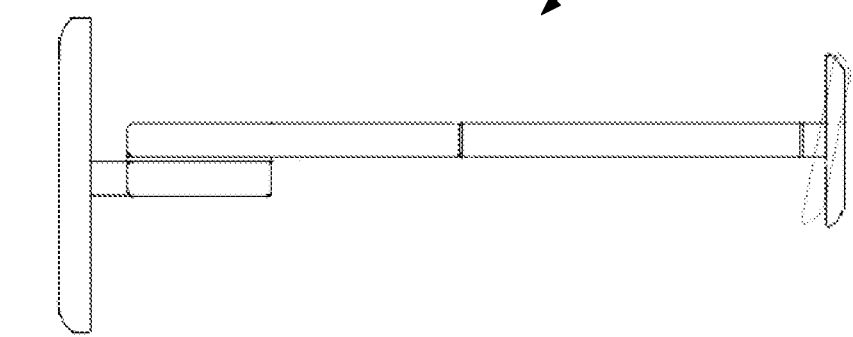
Figure 10:
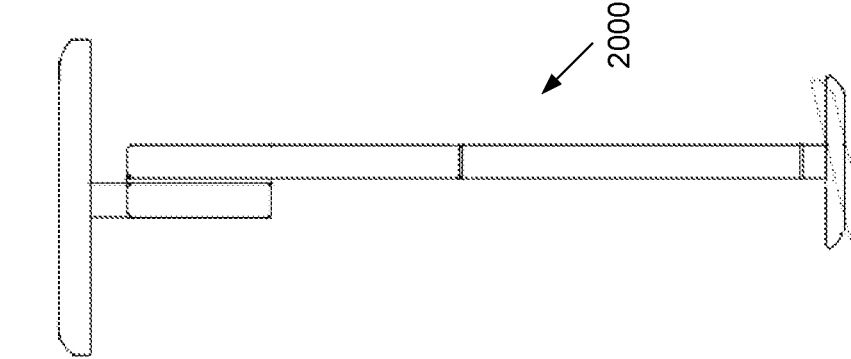

FIG. 12 of the Published Application comprises another view of the prototype 1000 of FIGS. 8-11 of the Published Application in a use orientation but without a surfboard supported thereon, and FIG. 13 of the Published Application comprises a closeup view of an adjustable leg of the prototype 1000 seen in FIG. 12 of the Published Application.

Figures 14, 15:
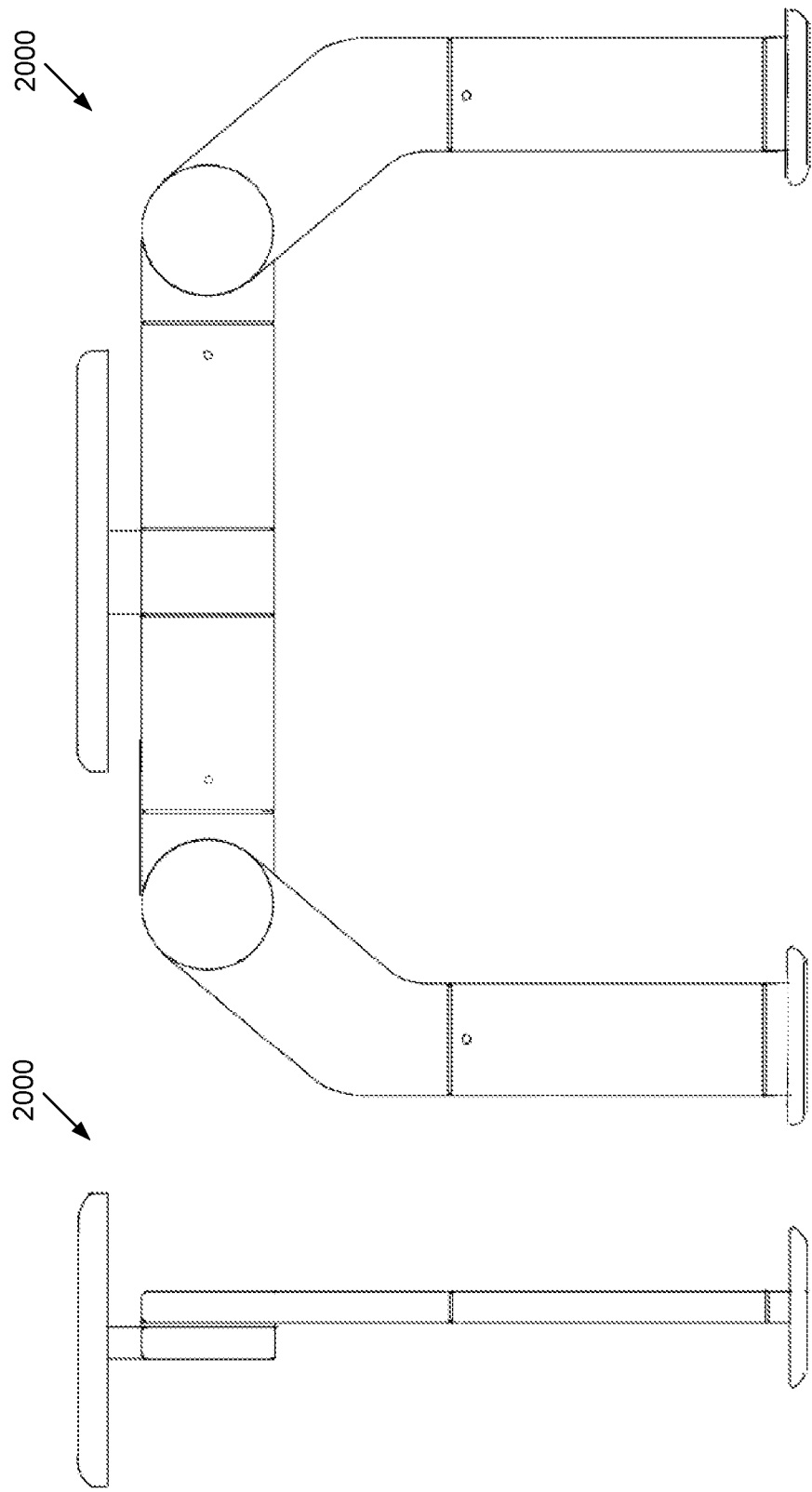
FIG. 14 comprises another view of the prototype 1000 in a nonuse orientation, whereby the top may be raised and attached to the windshield frame for locking and securing of the vehicle.
FIG. 15 comprises a photograph of an earlier prototype supporting a surfboard for vehicular transport, which photograph was taken on Sep. 3, 2017.
Figure 16:
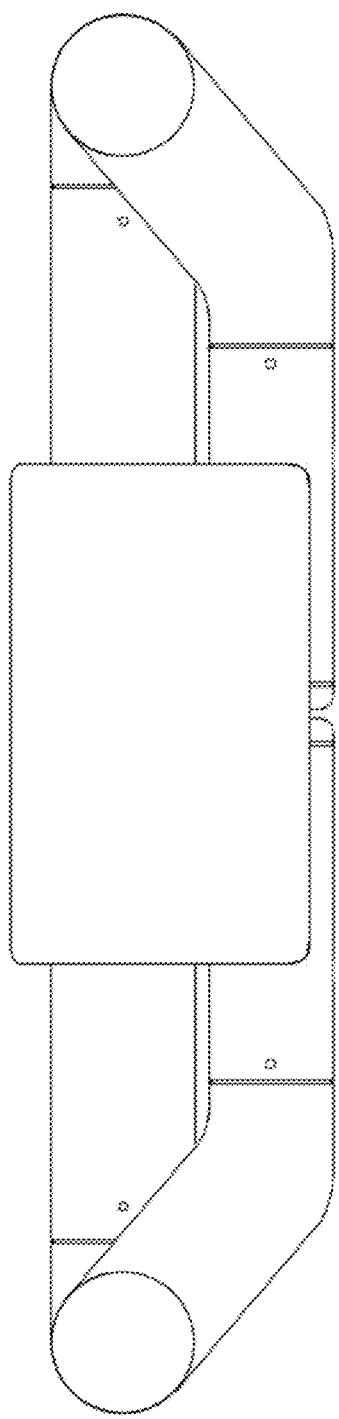
Figure 17:
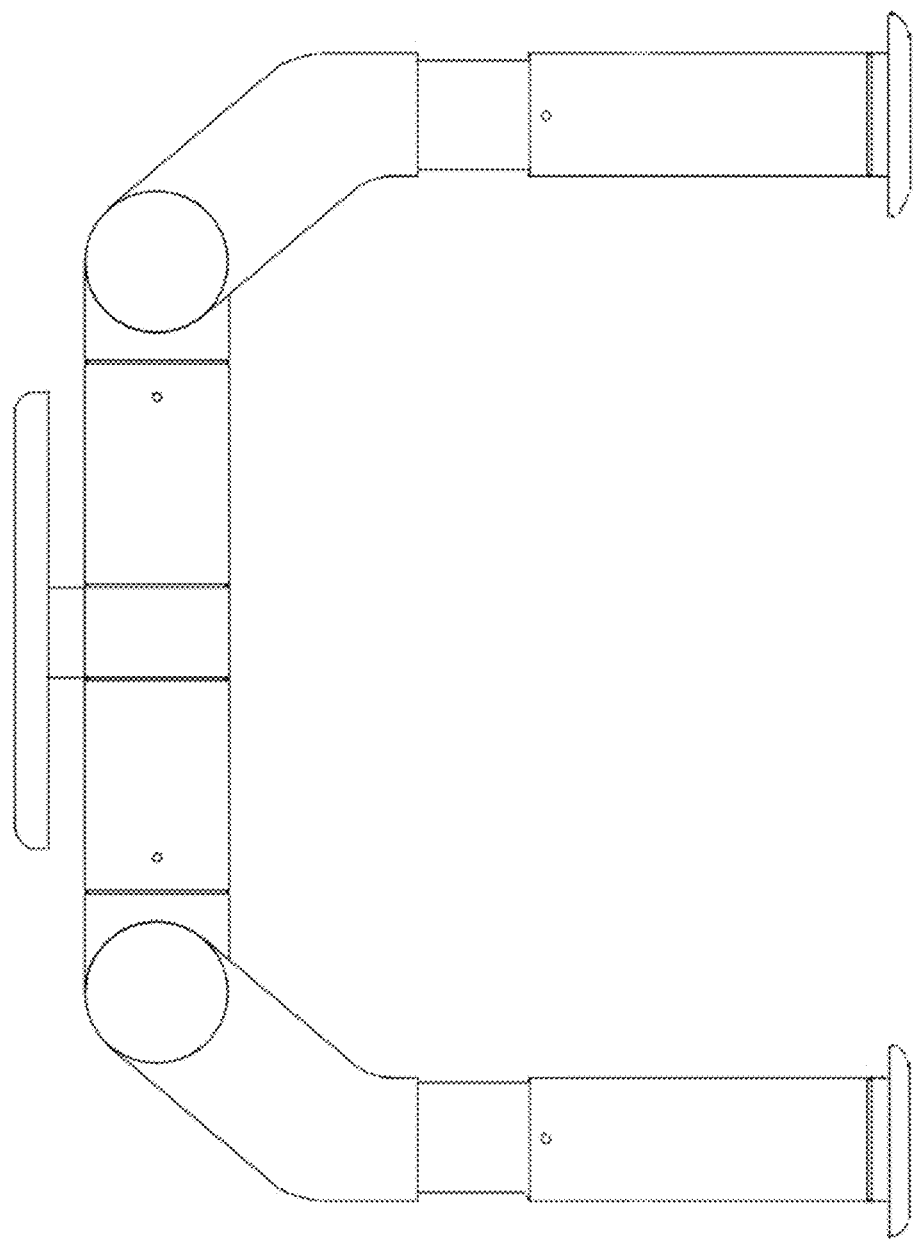
Figure 18:
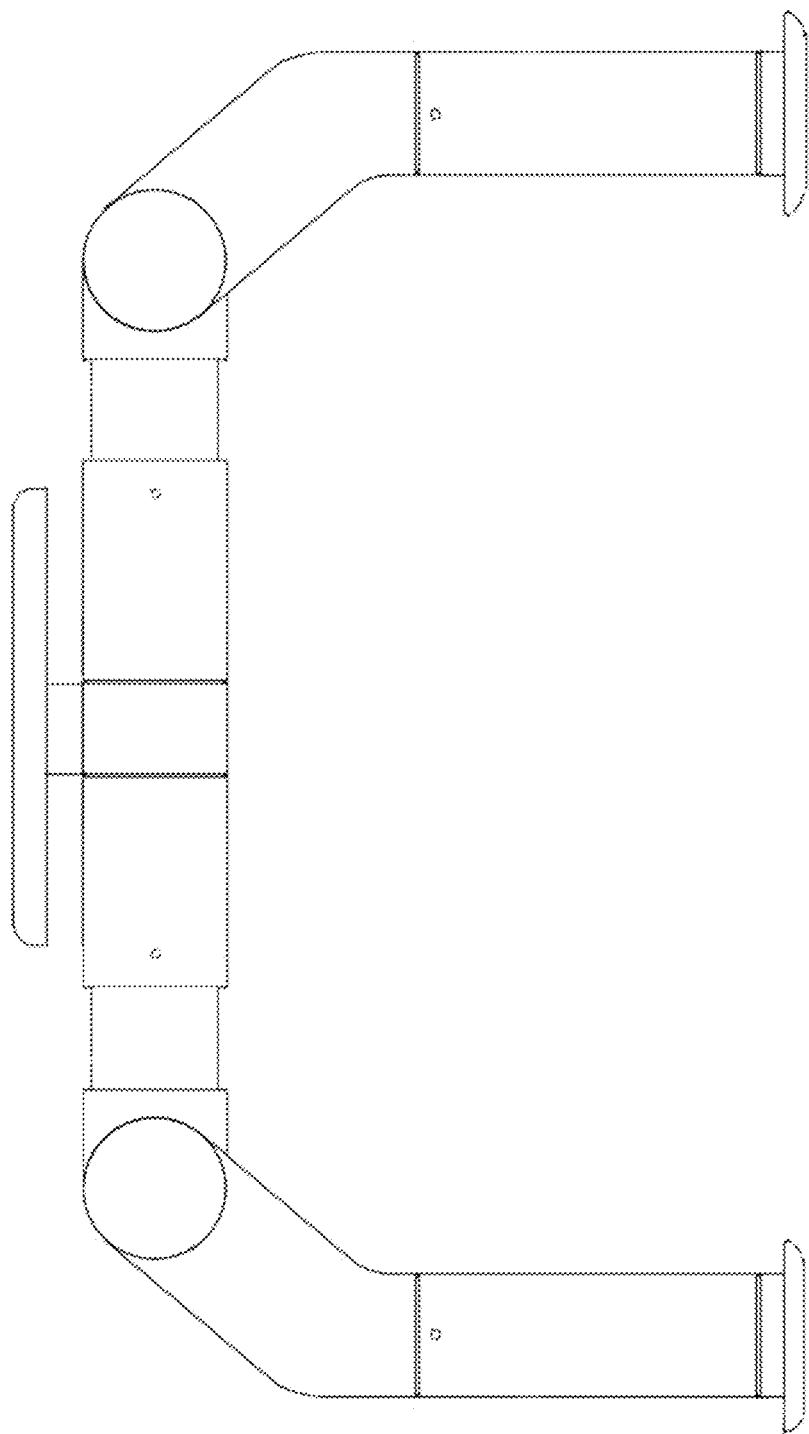
Figure 22:
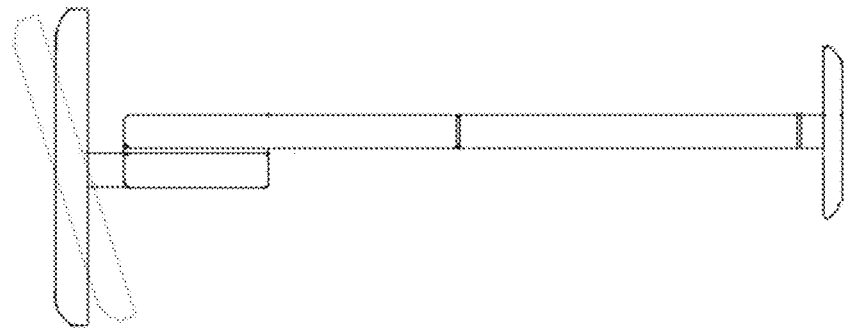
Figure 21:
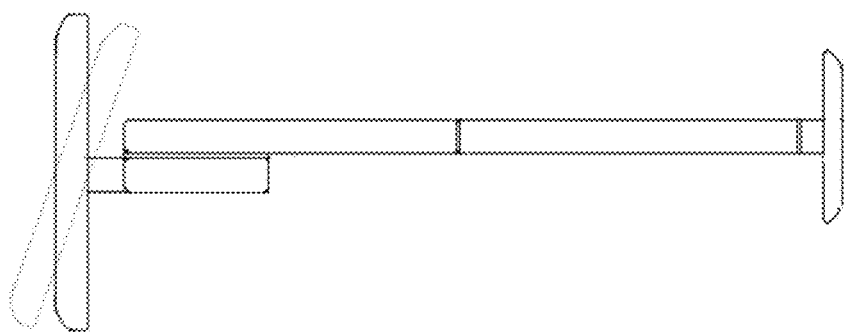
Figure 20:
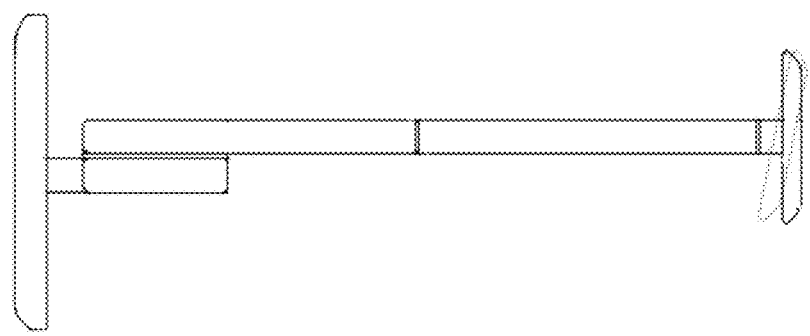
Figure 19:
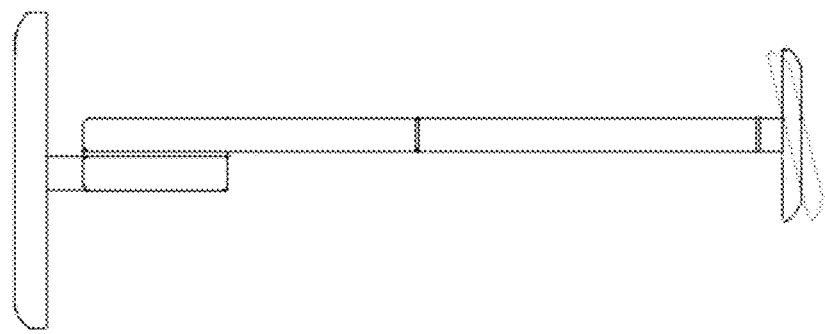

FIG. 14 of the Published Application comprises another view of the prototype 1000 in a nonuse orientation, whereby the top may be raised and attached to the windshield frame of the vehicle for locking and securing of the vehicle.

FIG. 15 of the Published Application comprises a photograph of an earlier prototype supporting a surfboard for vehicular transport, which photograph was taken on Sep. 3, 2017.

It has been observed during use of the prototypes that the prototypes do not evidence wobbling or other undesirable movement during transport of a surfboard. It is believed that this results from one or more of: the securing of the upper body support using the seatbelts; the positioning of the legs to conform to the incline of the seat back by pivoting of the legs relative to the feet; the adjustment of the height of the upper body support to clear the backs of the seats including any headrest and to level the supported board; the fitting of the platform to the surfboard by pivoting the platform relative to the arm portion, and rotating of the crossmember relative to the legs, so as to better mate and conform the surface of the platform to the surface of the surfboard; and the cushioning of the surfboard by the material of the platform.

Still yet additional vehicular transports are disclosed in FIGS. 7-15 and in the Appendix. Specifically, FIGS. 7-15 schematically illustrate another vehicular transport 2000 for a board in accordance with additional preferred embodiments of one or more aspects and features of the invention, and the Appendix illustrates an additional three such vehicular transports.

Based on the foregoing description, it will be readily understood by those persons skilled in the art that the present invention has broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. An apparatus for supporting an elongate object for vehicular transport, comprising:
   (a) a first leg adapted for placement on a seat of a backseat of a convertible;
   (b) a second leg adapted for placement on another seat of the backseat of the convertible; and
   (c) an upper support body supported by the first and second legs and comprising a platform for abutment and support thereon of the elongate object;
   (d) wherein the upper support body further comprises
      (i) a first elongate portion and a second elongate portion, each having a proximal, curved end,
      (ii) a rotatable crossmember that extends between the curved ends,
      (iii) a neck that is connected to and extends from the crossmember, and
      (iv) an arm portion that is connected both to the neck and to the platform;
   (e) wherein the platform comprises enclosed openings for receiving connectors of a strapping system for securing the elongate object to the platform; and
   (f) wherein each leg comprises an elongate portion with a foot at a distal end thereof for placement on the respective seat, the elongate portion being adjustably connected to a said elongate portion of the upper support body such that a distance between the upper support body and the foot is adjustable.

2. The apparatus of claim 1, wherein the elongate object comprises a board.

3. The apparatus of claim 1, wherein the legs are removable and are interchangeable.

4. The apparatus of claim 1, wherein the platform comprises a material that cushions the elongate object during vehicular transport.

5. The apparatus of claim 1, wherein the platform is formed from a resilient, material.

6. The apparatus of claim 1, wherein the platform is padded.

7. The apparatus of claim 1, wherein the enclosed openings of the platform comprise loops that are located at opposite lateral sides of the platform.

8. The apparatus of claim 1, wherein the apparatus comprises an additional platform for accommodating a second elongate object.

9. The apparatus of claim 1, wherein the apparatus comprises at least four pivotal joints.

10. The apparatus of claim 1, wherein the apparatus comprises six pivotal joints.

11. A method for supporting an elongate object during vehicular transport, comprising:
   (a) positioning an apparatus in a backseat of the convertible such that the apparatus stands on each of two seats of the backseat;
   (b) using seatbelts in the backseat of the convertible, securing the apparatus against backs of the seats;
   (c) with the top of the convertible down, positioning the elongate object onto a top of a frame of a windshield of the convertible while positioning the elongate object onto a platform of the apparatus; and
   (d) securing the elongate object to the platform of the apparatus using a strapping system;
   whereby the elongate object is supported on the convertible by the windshield frame and the platform of the apparatus stood up in the backseat of the convertible.

12. The method of claim 11, further comprising removing the elongate object for use and securing the apparatus during use of the elongate object by repositioning the platform downwardly, enclosing the convertible including putting the top of the convertible up, and locking the convertible with the apparatus securely contained within the enclosed convertible.

13. The apparatus of claim 1, wherein each foot includes a backstop for positioning against a back of the seat of the vehicle.

14. The apparatus of claim 1, wherein a said elongate portion of a said leg is received within an open end of a said elongate portion of the upper support body.

15. The apparatus of claim 1, wherein a said elongate portion of the upper support body is received within an open end of a said elongate portion of a said leg.

16. The apparatus of claim 1, wherein each said elongate portion of the upper support body comprises a sequence of openings and each said elongate portion of the legs comprises a sequence of openings, all of said openings being adapted to receive therethrough a cotter pin such that insertion of a cotter pin through both a selected one of the openings in a said elongate portion of the upper support body and an aligned one of the openings in a said elongate portion of a said leg secures said leg in a fixed position relative to the upper support body.

17. The apparatus of claim 1, wherein each said leg comprises a seatbelt guide comprising a hook or finger for grabbing a seatbelt.

18. The apparatus of claim 1, wherein each said leg comprises a seatbelt guide comprising an enclosed opening dimensioned to receive the end of a sDrawingseatbelt therethrough.

19. The apparatus of claim 1, wherein each said leg comprises two seatbelt guides.

20. The apparatus of claim 1, wherein a said leg comprises a lower seatbelt guide configured to restrain the leg from lifting upward and an upper seatbelt guide configured to restrain the leg against the back of a seat of the vehicle.

* * * * *